(12) United States Patent
Trenado et al.

(10) Patent No.: US 10,335,674 B1
(45) Date of Patent: Jul. 2, 2019

(54) VIDEO GAME CONTROLLER

(71) Applicant: Performance Designed Products LLC, Burbank, CA (US)

(72) Inventors: Rene Trenado, San Ysidro, CA (US); Antonio Meneses, Chula Vista, CA (US)

(73) Assignee: Performance Designed Products LLC, Burbank, CA (US)

( * ) Notice: Subject to any disclaimer, the term of this patent is extended or adjusted under 35 U.S.C. 154(b) by 0 days.

(21) Appl. No.: 16/116,832

(22) Filed: Aug. 29, 2018

Related U.S. Application Data

(60) Provisional application No. 62/683,245, filed on Jun. 11, 2018.

(51) Int. Cl.
*G06F 3/16* (2006.01)
*A63F 13/21* (2014.01)
(Continued)

(52) U.S. Cl.
CPC ............ *A63F 13/21* (2014.09); *A63F 13/215* (2014.09); *A63F 13/235* (2014.09); *A63F 13/24* (2014.09); *G06F 3/165* (2013.01); *A63F 13/87* (2014.09); *A63F 13/98* (2014.09); *A63F 2300/1025* (2013.01); *A63F 2300/1031* (2013.01);
(Continued)

(58) Field of Classification Search
CPC ........ A63F 13/21; A63F 13/24; A63F 13/215; A63F 13/235; A63F 13/87; A63F 13/98; A63F 2300/1025; A63F 2300/1031; A63F 2300/6063; A63F 2300/6081; G06F 3/165
See application file for complete search history.

(56) References Cited

U.S. PATENT DOCUMENTS 5,026,051 A 6/1991 Lowe et al.
7,433,479 B2 10/2008 Sato
(Continued)

FOREIGN PATENT DOCUMENTS

KR 2004 0106840 12/2004

OTHER PUBLICATIONS

Selix, J., "PS4: How to Output All Audio to Headphones Plugged into DualShock 4 Controller", posted Nov. 16, 2013; LINK: https://www.tech-recipes.com/rx/46201/ps4-how-to-output-all-audio-to-headphones-plugged-into-dualshock-4-controller/.
(Continued)

*Primary Examiner* — William H McCulloch, Jr.
(74) *Attorney, Agent, or Firm* — Knobbe, Martens, Olson & Bear LLP

(57) ABSTRACT

A video game controller can automatically operate as a video game controller with audio capability and a video game controller without audio capability based upon a signal received via a switch in communication with an audio jack of the video game controller when a headset is coupled to the audio jack. Connection of the headset to the controller automatically causes video game audio to be communicated from the video game console to the headset via the controller. The video game audio is communicated at a default volume level to the headset upon coupling of the headset to the video game controller. The volume level of the audio communicated to the headset can be adjustable up or down via a directional pad of the video game controller while an audio control button on the video game controller is pressed.

20 Claims, 9 Drawing Sheets

(51) Int. Cl.
*A63F 13/24* (2014.01)
*A63F 13/87* (2014.01)
*A63F 13/98* (2014.01)
*A63F 13/215* (2014.01)
*A63F 13/235* (2014.01)

(52) U.S. Cl.
CPC .............. *A63F 2300/6063* (2013.01); *A63F 2300/6081* (2013.01)

(56) References Cited

U.S. PATENT DOCUMENTS

| | | | |
|---|---|---|---|
| 8,529,356 | B2 | 9/2013 | Soelberg et al. |
| 9,277,340 | B2 * | 3/2016 | Mizuta ................ H04R 29/001 |
| 9,630,099 | B2 * | 4/2017 | Kuwahara ............. A63F 13/10 |
| 10,143,921 | B1 * | 12/2018 | Strahle ................ A63F 13/424 |
| 10,191,714 | B2 * | 1/2019 | Wiggemans ....... A63F 13/2145 |
| 2006/0147059 | A1 * | 7/2006 | Tang ..................... H04R 5/04 381/104 |
| 2006/0205505 | A1 * | 9/2006 | Hussaini ............... A63F 13/06 463/36 |
| 2007/0202950 | A1 * | 8/2007 | Hussaini ............... A63F 13/06 463/39 |
| 2009/0208900 | A1 | 11/2009 | Hou |
| 2010/0040240 | A1 * | 2/2010 | Bonanno ............... A63F 13/02 381/74 |
| 2017/0206054 | A1 * | 7/2017 | Wiggemans ....... A63F 13/2145 |
| 2017/0269897 | A1 * | 9/2017 | Wiggemans ....... A63F 13/2145 |
| 2018/0267771 | A1 * | 9/2018 | Wiggemans ....... A63F 13/2145 |

OTHER PUBLICATIONS

Viking Brent "Why the Headphone Port is the Dualshock 4's Best Feature," published on Dec. 11, 2013, YouTube; LINK: https://www.youtube.com/watch?v=piNzyH8d5y8.

* cited by examiner

VIDEO GAME CONTROLLER

CROSS-REFERENCE TO RELATED APPLICATIONS

Any and all applications for which a foreign or domestic priority claim is identified in the Application Data Sheet as filed with the present application are hereby incorporated by reference under 37 CFR 1.57, and should be considered a part of this specification.

BACKGROUND

Field

The present invention is directed to video game controllers, and more particularly to video game controllers configurable as a video game controller with audio capabilities and a standard video game controller without audio capabilities.

Description of the Related Art

Video gaming is very popular and has become increasingly complex, requiring video game controllers with multiple inputs (e.g., buttons, thumbsticks, directional pads, paddles, etc.) that can be actuated (e.g., pressed, pivoted, pulled, etc.) to activate functions within the video game. As the inputs are actuated, electrical signals are generated, processed and/or transmitted to a gaming console to which the controller connects. The console operates the video game at least in part based on the signals it receives from the controller. There are different gaming consoles in the market, and each console may use a different type of controller (e.g., having different types or combination of inputs).

Some video game controllers can connect to the video game console in a wired manner. Other video game controllers can connect to the video game console in a wireless manner. When the video game console does not support audio transfer via the video game controller connection, video game audio is provided via the television or monitor connected with the video game console, whether or not the video game controller has audio capabilities (e.g., can connect to a headset worn by the user via which game audio and chat audio can be provided). When the video game console does support audio transfer via the video game controller connection, audio can be transferred to an audio-capable video game controller connected to the video game console, but requires the user to manually select such audio transfer to the video game controller via a control menu (e.g., displayed on the television or video screen by the video game console).

SUMMARY

In accordance with one aspect of the disclosure, a video game controller is provided that can automatically operate as a standard video game controller without audio capability and a video game controller with audio capability.

In accordance with one aspect of the disclosure, a video game controller is provided that can automatically operate as a standard video game controller without audio capability and a video game controller with audio capability based upon a signal received via an audio jack of the video game controller.

In accordance with one aspect of the disclosure, a video game controller is provided that can automatically operate as a video game controller with audio capability based upon a signal received via a switch in an audio jack of the video game controller when a headset is coupled to the audio jack of the video game controller, causing game audio to be communicated from the console to the headset via the controller. Optionally, the game audio is communicated at a default volume level to the headset upon coupling of the headset to the video game controller. Optionally, the volume level of the audio communicated to the headset is adjustable up or down via a directional pad of the video game controller while an audio control button on the video game controller is pressed.

In accordance with one aspect of the disclosure, a video game controller is provided that can automatically operate as a standard video game controller without audio capability and a video game controller with audio capability based upon a signal received via an audio jack of the video game controller. The signal is provided by a switch in communication with the microcontroller unit (MCU) of the video game controller. Optionally, the switch can be a contact switch. Optionally, the switch can be a pressure switch.

Optionally, the video game controller that can automatically operate as a standard video game controller without audio capability and a video game controller with audio capability based upon a signal received via an audio jack of the video game controller can be used with the Nintendo Switch™ video game console.

In accordance with one aspect of the disclosure, a method of operating a video game controller that can automatically operate as a standard video game controller without audio capability and a video game controller with audio capability based upon a signal received via an audio jack of the video game controller is provided. The video game controller can first be connected to the video game console (e.g., connected in a wired manner, connected in a wireless manner). If the MCU of the video game controller does not receive a signal from a switch of the video game controller indicating a headset is connected to the video game controller, the MCU enumerates the controller with game operation descriptors and communicates this to the video game console to provide functionality for playing a video game on the console with the video game controller. Additionally, the video game console sends game audio to the television or monitor connected to the console. When the MCU of the video game controller receives a signal from the switch of the video game controller indicating a headset is connected to the video game controller (e.g., via the audio jack on the controller), the MCU enumerates the controller with descriptors for audio and game operation and communicates this to the video game console. Optionally, the MCU (e.g., a USB controller of the MCU) electronically simulates the disconnection and reconnection of the video game controller with the console (e.g., a power ON-OFF reset function), without mechanically disconnecting the connection (e.g., HDMI connection) between the video game controller and the console. The video game console then recognizes the video game controller as an audio enabled controller, ceases sending audio to the television or monitor connected to the console, and instead routes the game audio to the headset via the video game controller that is connected to the console.

In accordance with one aspect of the disclosure, a video game controller is provided. The video came controller comprises a controller body, a processor housed in the controller body, and a plurality of control inputs comprising a directional pad, a pair of thumbsticks and a plurality of buttons, each of the plurality of control inputs operable to control one or more operations of a video game, the processor configured to convert one or more operations of the plurality of control inputs into electrical signals and to communicate such signals to a video game console via a cable. The video game controller also comprises an audio jack configured to receive an audio connector for a headset, the audio jack configured to communicate with the processor. The video game controller also comprises a switch in communication with the audio jack and with the processor, the switch configured to detect when the audio connector is coupled to the audio jack and to communicate a detection signal of said connection to the controller. The processor is operable to automatically communicate data to the video game console indicating the controller is audio enabled following receipt of the detection signal from the switch indicating the connection between the audio connector for the headset and the audio jack. The processor is further configured to automatically route audio from the video game console to the headset at a default volume level upon receiving the detection signal from the switch indicating the connection between the audio connector for the headset and the audio jack, the processor configured to automatically adjust a volume level of the audio communicated from the console to the default volume level prior to communicating the audio to the headset.

In accordance with another aspect of the disclosure, a video game controller is provided. The video game controller comprises a controller body, a processor housed in the controller body, and a plurality of control inputs operable to control one or more operations of a video game. The processor is configured to convert one or more operations of the plurality of control inputs into electrical signals and to communicate such signals to a video game console via a cable. The controller body also comprises an audio jack configured to receive an audio connector for a headset, the audio jack configured to communicate with the processor. The video game controller also comprises a switch in communication with the audio jack and with the processor, the switch configured to detect when the audio connector is coupled to the audio jack and to communicate a detection signal of said connection to the controller. The processor is operable to automatically communicate data to the video game console following receipt of the detection signal from the switch. The processor is further configured to automatically adjust a volume level of the audio communicated from the console to a default volume level and to automatically route the audio from the video game console to the headset at the default volume level upon receiving the detection signal from the switch.

In accordance with another aspect, a method for operating a video game controller is provided. The method comprises connecting a video game controller to a video game console via a cable. The video game controller comprises a controller body, a processor housed in the controller body, a plurality of control inputs operable to control one or more operations of a video game. The processor is configured to convert one or more operations of the plurality of control inputs into electrical signals and to communicate such signals to the video game console. The video game controller also comprises an audio jack configured to receive an audio connector for a headset, the audio jack configured to communicate with the processor. The video game controller also comprises a switch in communication with the audio jack and with the processor, the switch configured to detect when the audio connector is coupled to the audio jack and to communicate a detection signal of said connection to the controller. The processor is operable to automatically communicate data to the video game console following receipt of the detection signal from the switch, the processor further configured to automatically adjust a volume level of the audio communicated from the console to a default volume level and to automatically route the audio from the video game console to the headset at the default volume level upon receiving the detection signal from the switch. The method also comprises connecting the audio connector of the headset to the audio jack of the video game controller to cause the processor to automatically communicate data to the video game console following receipt of the detection signal from the switch, the processor further automatically adjusting a volume level of the audio communicated from the video game console to a default volume level and automatically routing the audio from the video game console to the headset at the default volume level.

DETAILED DESCRIPTION

Figure 1:
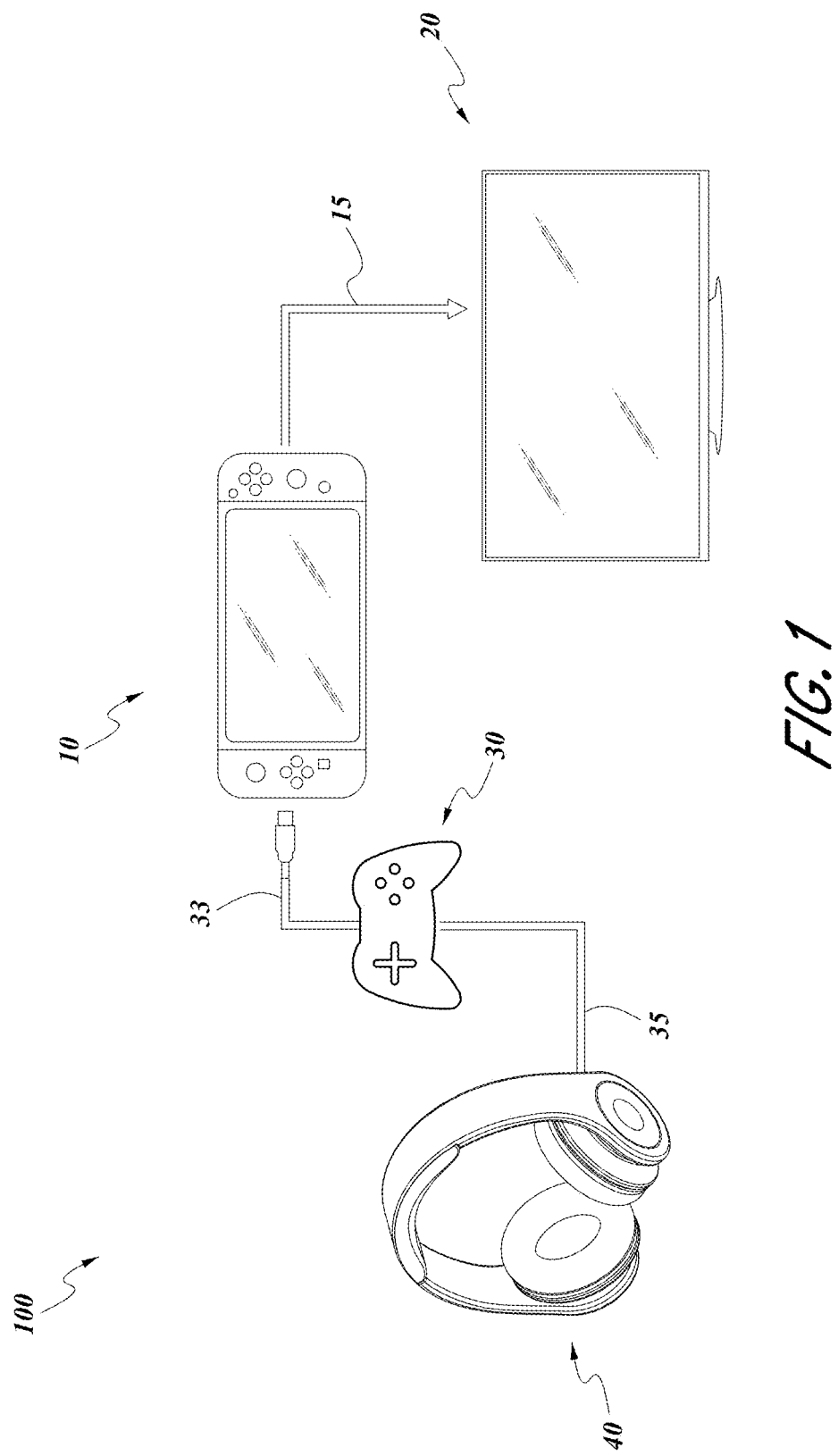
FIG. 1 is a schematic system diagram of a video game controller that can connect to a video game console and to a headset, the console connected to a television or video monitor.

FIG. 1 shows a schematic diagram of a video game system 100. The video game system 100 can include a video game console 10. In the illustrated embodiment, the video game console 10 is a NINTENDO® Switch™ console. The video game console 10 can optionally be connected to a television or video monitor 20 (e.g., via a cable 15, such as HDMI cable). A video game controller 30 can optionally be removably connected to the video game console 10 (e.g., via a cable 33). Optionally, a headset 40 can be removably connected to the video game controller 30 (e.g., via a cable 35, such as a USB cable).

The video game controller 30 can have one or more control inputs, such as thumbsticks, directional pads, buttons (e.g., A/B/X/Y buttons), paddles, triggers, etc., to effect different functionalities while playing a video game on the video game console 10. Though not shown, the video game controller 30 has a connector that removably receives a connector (e.g., USB connector) of the cable 35 to connect the headset 40 to the video game controller 30. Though not shown, the video game controller 30 has a connector that removably receives a connector of the cable 33 to connect the video game controller 30 to the video game console 10.

Figure 2:
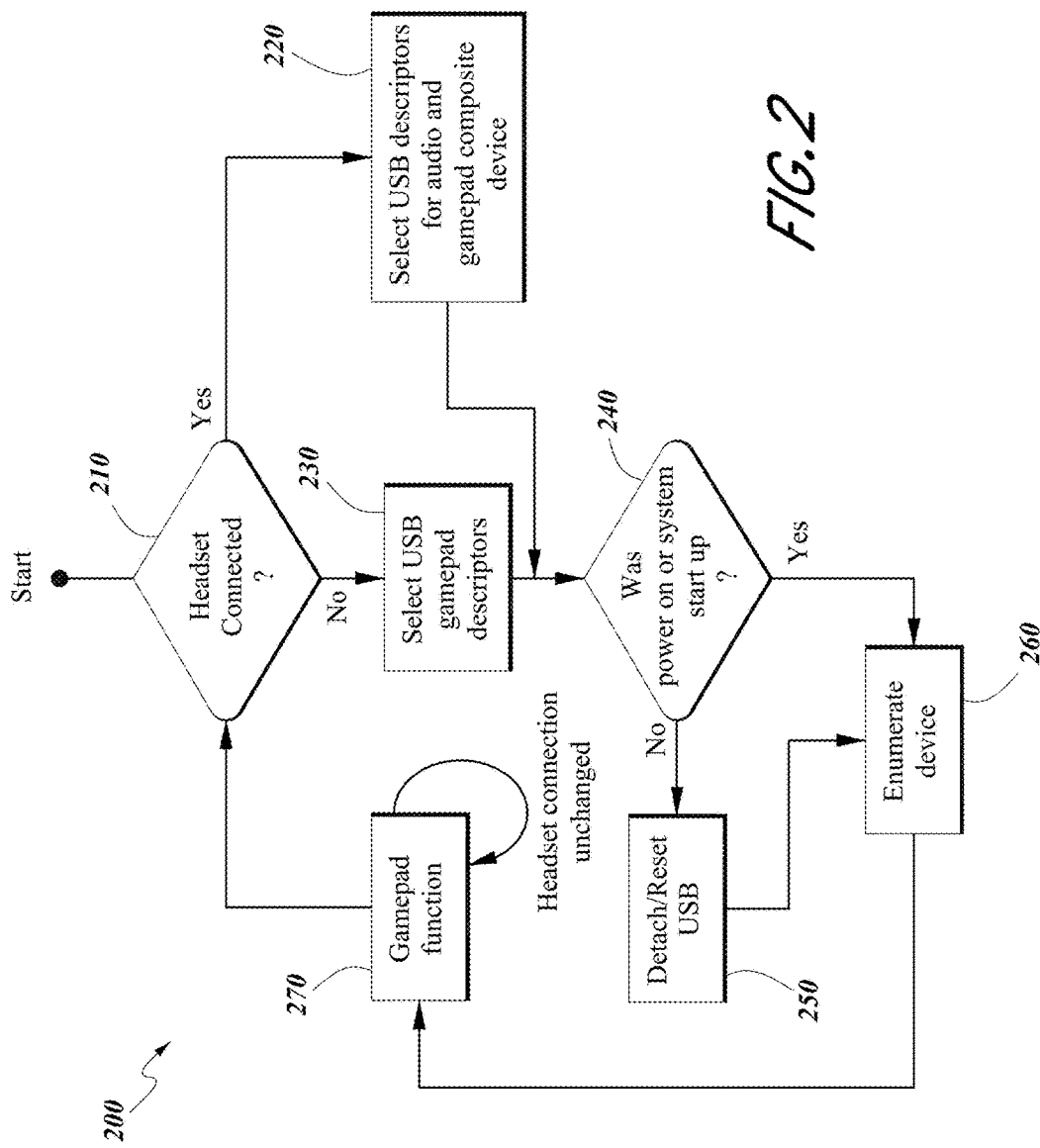
FIG. 2 is a flowchart showing a firmware control process implemented by the video game controller based on whether a headset is connected to the video game controller.

FIG. 2 shows a firmware control process 200 implemented by the video game controller 30 (e.g., by the MCU of the controller 30) based on whether the headset 40 is connected to the video game controller 30. The method includes the step of detecting 210 if the headset 40 is connected to the controller 30 (e.g., if an audio jack of the controller 30 has received the connector of the cable 35 attached to the headset 40). If the headset connection is not detected, then USB gamepad descriptors (e.g., to enable playing the video game with the control inputs of the controller 30) are automatically selected 230. Alternatively, if the headset connection is detected, then USB descriptors for audio and gamepad composite device (e.g., to enable playing the video game with the control inputs of the controller 30 as well as enable audio transfer from the console 10 via the controller 30 to the headset 40) are automatically selected 220.

With continued reference to FIG. 2, the process 200 includes determining 240 whether the detection of whether the headset is connected occurs while power to the system 100 was on or during startup of the system 100. If the answer is no, then the USB connection with the headset is detached and/or reset 250, as discussed further below, and then the MCU enumerates 260 the controller 30, 300. Alternatively, if the answer is yes, then the MCU enumerates 260 the controller 30, 300 without requiring the detachment/resetting of the USB connection. The MCU then automatically communicates the enumerated device information to enable gamepad function 270.

Figure 3A:
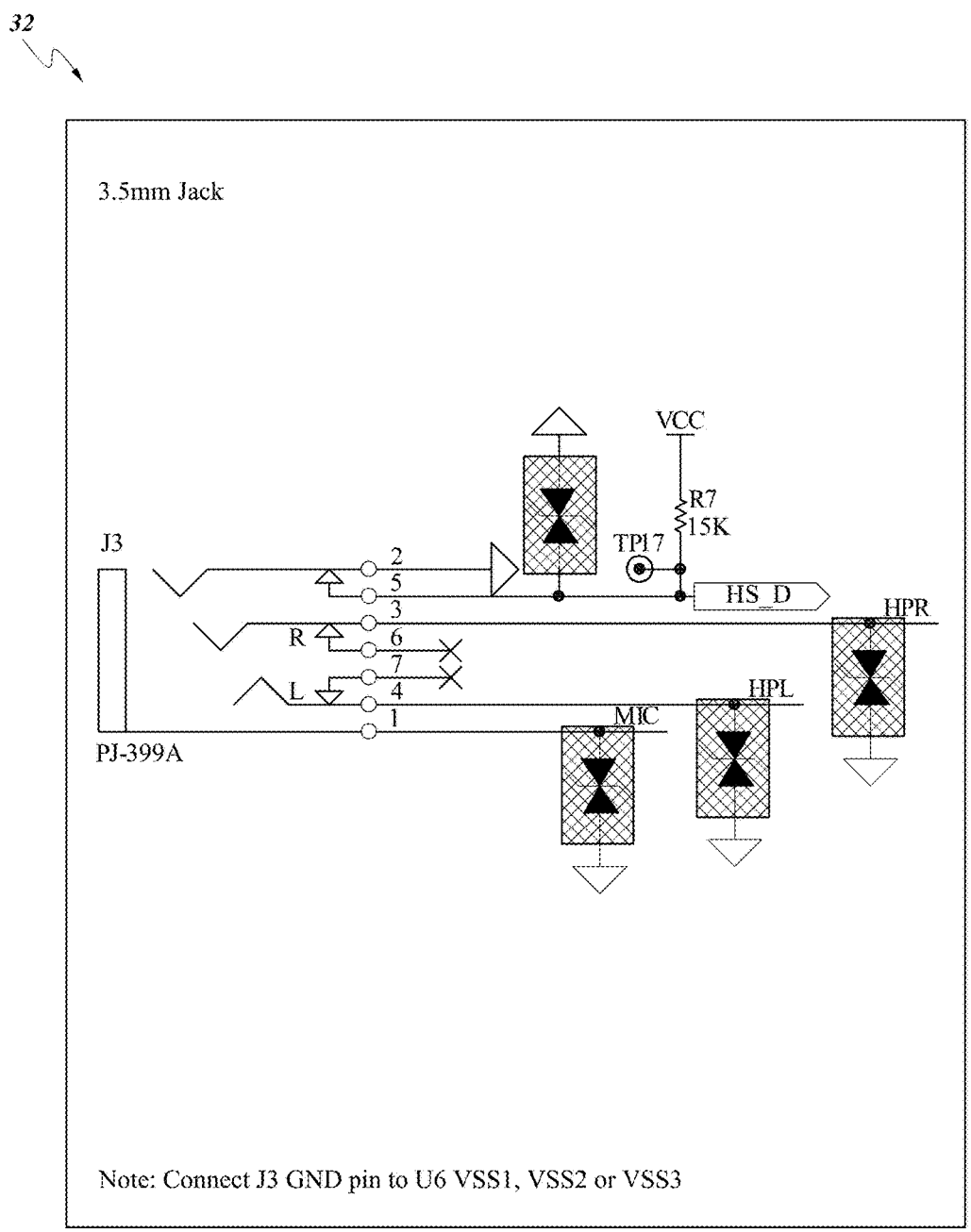
FIG. 3A is a circuit diagram of a portion of the video game controller associated with audio function provided by the controller.
Figure 3B:
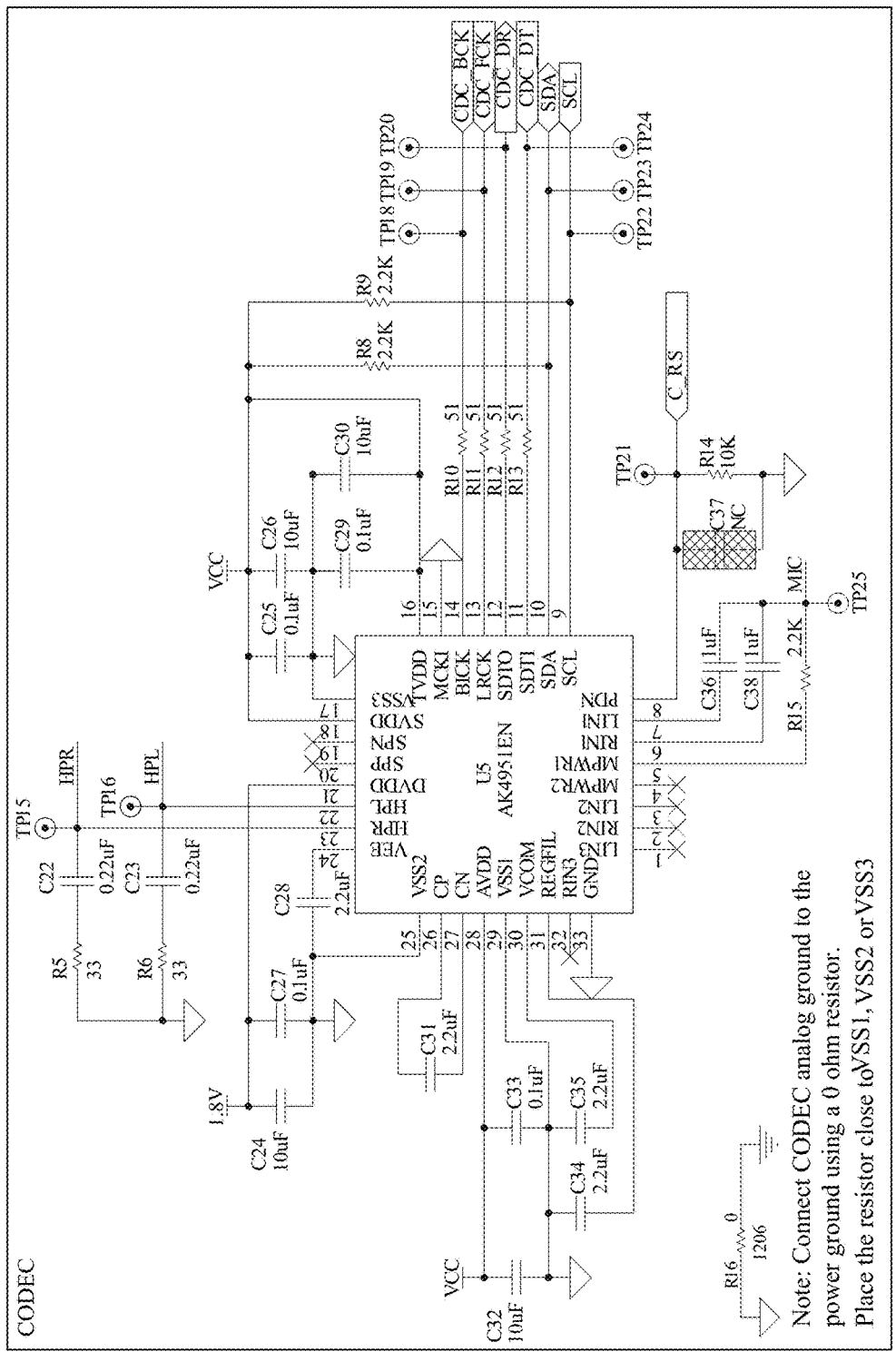
FIG. 3B is a circuit diagram of another portion of the video game controller associated with audio function provided by the controller.

FIGS. 3A-3B shows circuit diagrams associated with the audio function of the video game controller 30, 300. In particular, FIG. 3A shows the circuit diagram for the audio jack of the video game controller 30, 300, which includes a switch 32 used to sense connection of the headset cable 35 to the controller 30, 300. The HD_S trace connects the switch to the MCU of the controller 30, 300. The HD_S trace is a logic level that changes in state (e.g., from 0 to 1 or 1 to 0) depending on whether the connector of the headset 40 is coupled to the audio jack of the controller 30, 300. When the headset 40 is connected to the controller 30, 300, the MCU resets the internal USB hardware or USB controller 37 to simulate the unplugging and plugging back of the controller 30, 300 to the video game console 10 (e.g., without physically disconnecting and reconnecting the controller 30, 300 to the console 10). FIG. 3B shows a circuit diagram for a CODEC 39 used associated with the audio function of the video game controller 30, 300.

Figure 4:
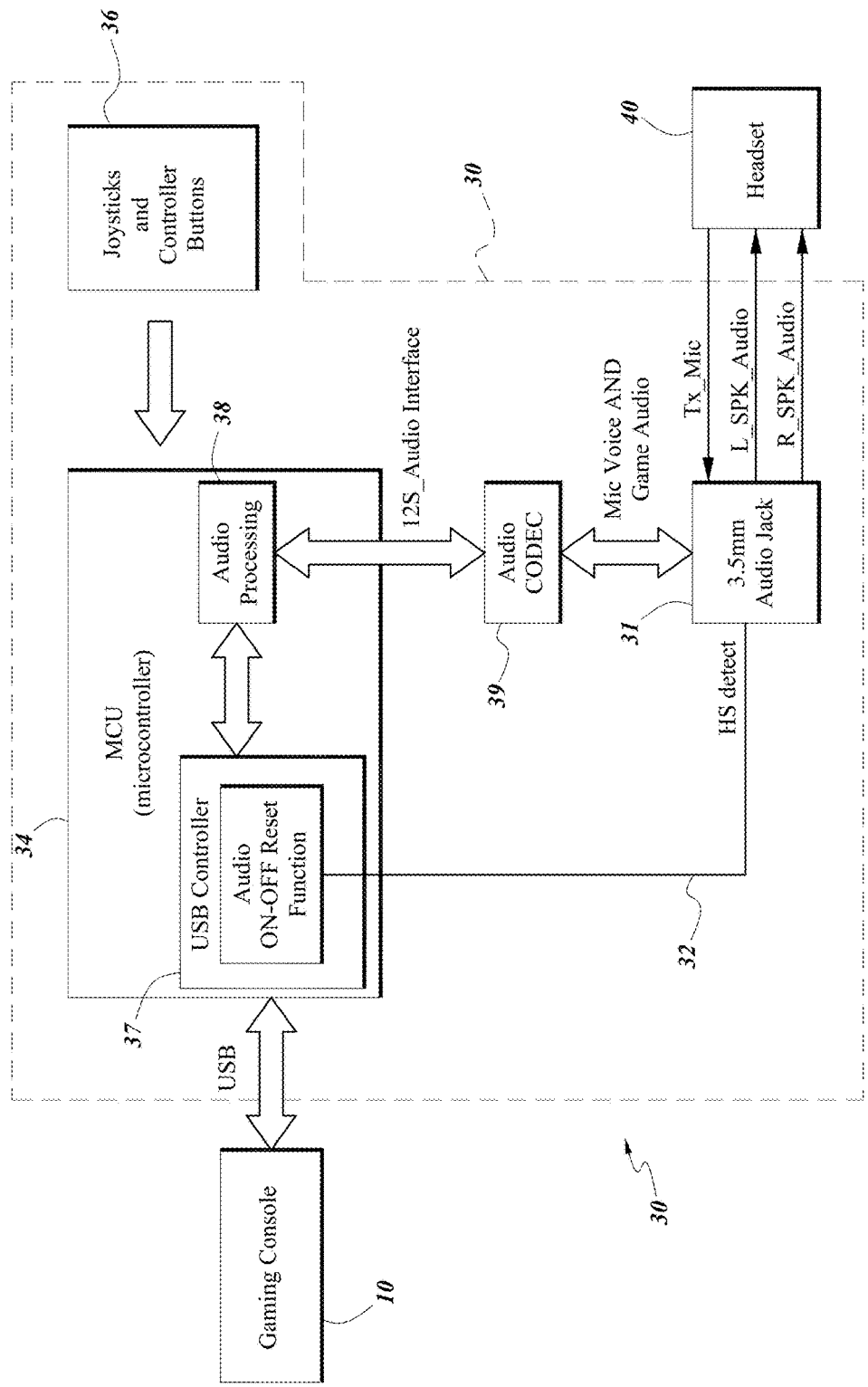
FIG. 4 shows a block diagram of the video game controller operation when coupled to a headset.

FIG. 4 shows a block diagram of the operation of the video game controller 30. The controller 30 has a microcontroller unit (MCU) 34 that includes a USB controller 37 and audio processing circuitry 38. The MCU 34 receives inputs from the control inputs 36 (such as joystick, controller buttons, directional pad, etc.). The USB controller 37 receives a detection signal (via the switch 32) from the audio jack 31 of the controller 30 when the headset 40 is connected to the audio jack 31. The audio jack 31 also communicates with the audio processing circuitry 38 via the audio CODEC 39. The audio jack 31 transmits sound to the headset 40 (e.g., left speaker audio, L_SPK_Audio, and right speaker audio, R_SPK_Audio) and receives audio (e.g., from headset microphone, Tx_Mic) from the headset 40. The USB controller 37 can perform one or more operations in the firmware control process (see FIG. 2). For example, the USB controller 37 of the MCU 34 can reset the internal USB hardware to simulate unplugging and plugging back of the controller 30, 300 to the console 10 upon receipt of the signal from the switch 32 indicating connection of the headset 40 to the controller 30, 300. Such simulated unplugging and plugging back of the controller 30, 300 allows the controller 30, 300 to reset the USB descriptors sent to the console 10 by the controller 30, 300 to indicate audio capability so that video game audio is automatically sent to the headset 40 from the console 10 rather than to the television monitor 20. Advantageously, this simulated unplugging and plugging back of the controller 30, 300 allows audio to be automatically sent to the headset 40 via the controller 30, 300 without having to physically (e.g., mechanically) unplug and plug back the controller 30, 300 to the console 10.

Figure 5:
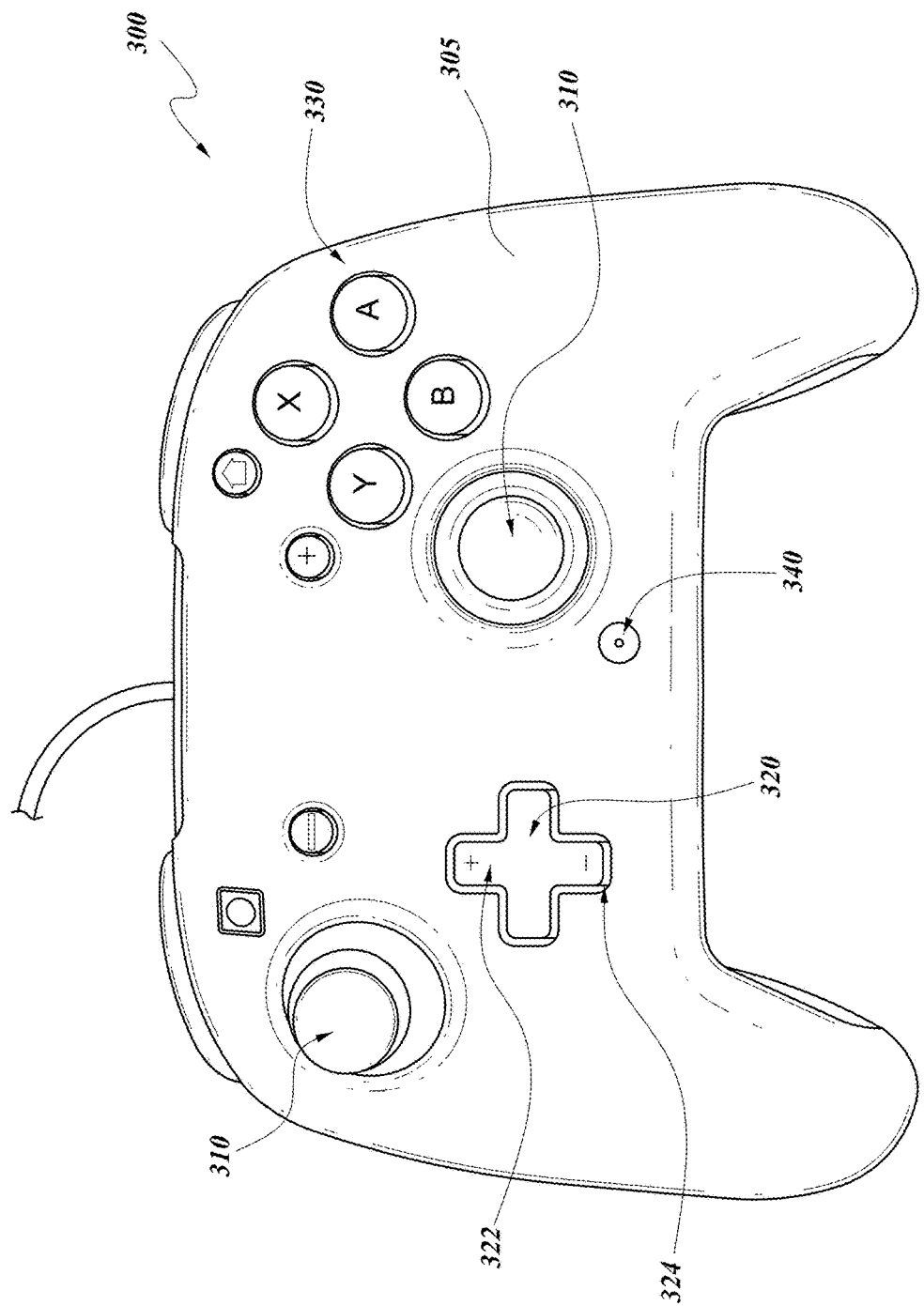
FIG. 5 is a front view of a video game controller with audio controls.

FIG. 5 shows a front view of a video game controller 300, which can operate like the video game controller 30 in FIG. 1. The video game controller 300 has a pair of thumbsticks 310, a directional pad 320, a plurality of buttons (e.g., ABXY buttons) 330 and an audio function button 340. The audio function button 340 optionally extends through an upper casing 305 of the controller 300 and is optionally proximate to (e.g., adjacent) one of the thumbsticks 340. The directional pad 320 can optionally be shaped like a cross with four members, including an upper member (upper cross member) 322 and a lower member (lower cross member) 324.

Figure 6:
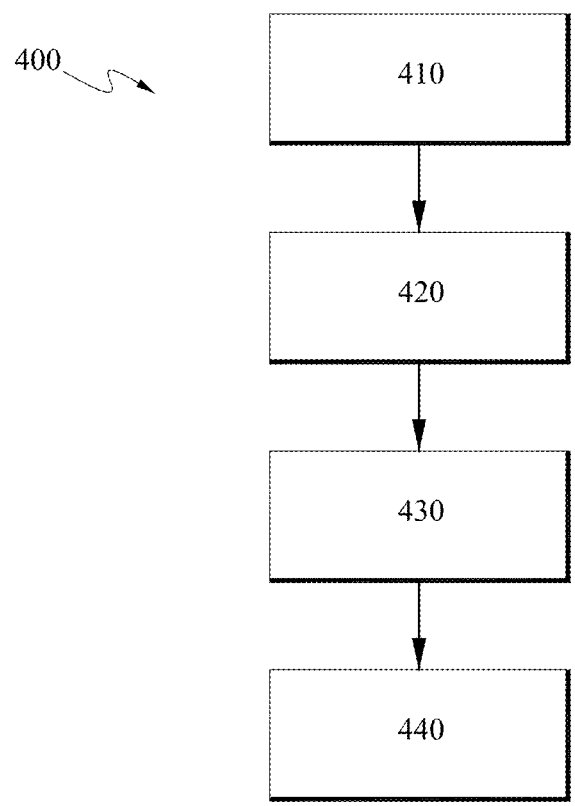
FIG. 6 is a block diagram showing a process for connecting a video game controller to a video game console.

FIG. 6 shows a block diagram of a process 400 for connecting a controller 30, 300 to a video game console 10 (e.g. Nintendo® Switch™) for operation. The process 400 includes the optional step of connecting 410 the console 10 into a dock. The process 400 also includes connecting 420 an end of the cable (e.g., USB A end of cable) 33 attached to the controller 30, 300 to the dock (e.g., to one of the USB ports). The process 400 also includes waking up 430 the console 10 (e.g., by pressing a power button on the console 10). The process 400 also optionally includes indicating 440 that the controller 30, 300 is connected to the console 10 (e.g., via a visual indicator, such as an LED light, home button LED light, etc.).

Figure 7:
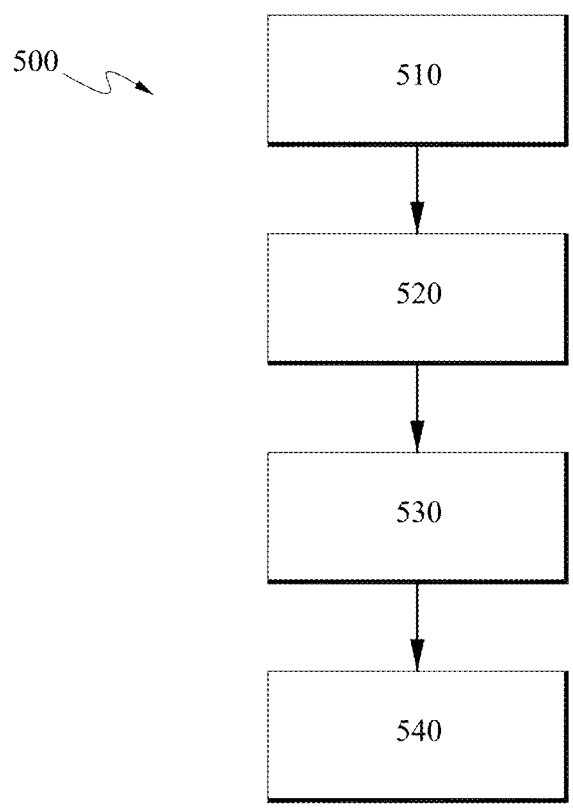
FIG. 7 is a block diagram showing a process for connecting a headset to a video game controller, such as the video game controller of FIG. 5.

FIG. 7 shows a block diagram of a process 500 for connecting a headset 40 to the video game controller 30, 300 to automatically have audio sent to the headset 40 from the video game console 10 via the controller 30, 300. The process 500 includes connecting 510 the headset 40 to the controller 30, 300 (e.g., inserting the 3.5 mm plug of the headset 40 into the 3.5 mm port of the controller 30, 300). If the controller 30, 300 was already connected to the console 10 (as described above), the process 500 optionally includes pressing 520 an input (e.g., one or more ABXY buttons 330, a left and right members of the D-pad 320) of the controller 30, 330 (e.g., in response to a prompt from the console 10). The process 400 includes automatically directing 530 game audio to the headset 40 from the console 10 in response to connecting 410 the headset 40 to the controller 30, 300. The process 500 further includes activating 540 a mic on the headset 40 for chat-enabled video games.

Figure 8:
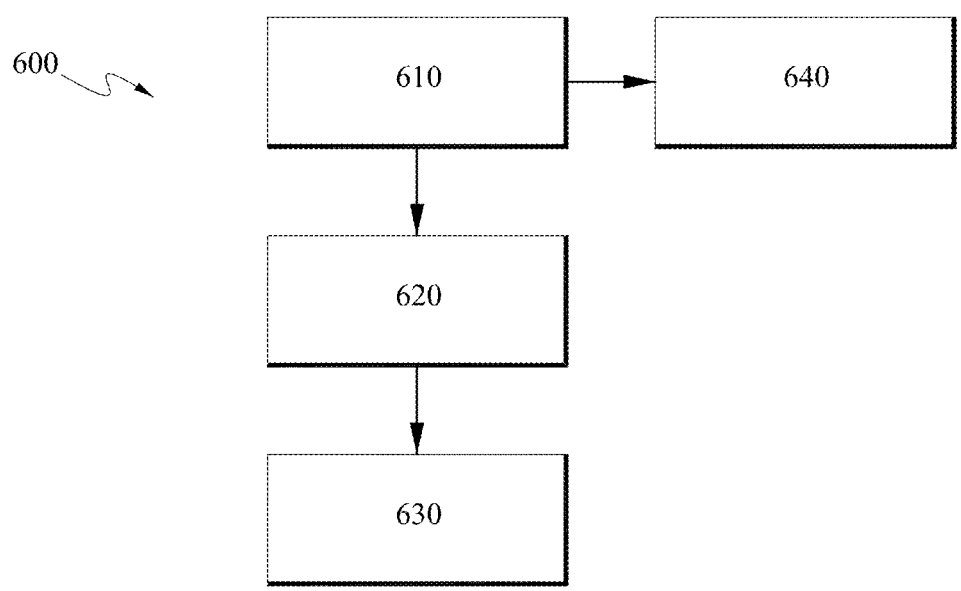
FIG. 8 is a block diagram showing a process for operating audio controls on the video game controller, such as the video game controller of FIG. 5.

FIG. 8 shows a block diagram of a process 600 for adjusting a volume level of the audio directed to the headset 40 via the controller 30, 300 (e.g., control the volume level on the controller 30, 300, not the volume level of the console 10). The process 600 includes pressing 610 the audio function button 340 of the controller 30, 300 (e.g., pressing and holding down the button 340), thereby causing an input control (e.g., directional pad, ABXY buttons, thumbstick) to change from a first operating mode (e.g., game control operating mode) to a second operating mode (e.g., audio control operating mode). The process 600 also includes pressing 620 an input control member in one direction of another direction to adjust the audio volume up or down. In one implementation, the input control member is the directional pad 320 that is pressed in one direction (e.g., up) or another direction (e.g., down) to adjust the audio volume up or down (e.g., while continuing to press and hold the audio function button 340). The process 600 also includes releasing 630 (e.g., not touching or pressing) the audio function button 340, causing the input control to revert back to the first operating mode. The process 600 also optionally includes pressing 640 (e.g., pushing and holding down) the audio function button 340 for a predetermined period of time (e.g., 2 seconds, 3 seconds) to cause a mic of the headset 40 to be muted, and pressing the audio function button 340 again (e.g., for less than the predetermined time) to cause the mic to be unmuted.

In operation, the user optionally connects the video game controller 30, 300 (without the headset 40 connected to the controller 30, 300) to the video game console 10 (e.g., to the NINTENDO® Switch™ via a cable), for example via the cable 33 (e.g., USB connection, as described above). The console 10 automatically receives information from the controller 30, 300 identifying the controller as a standard (non-audio enabled) controller and routes video game audio to the television 20 connected to the console 10. Optionally, the console 10 can request the user to press one or more buttons on the controller 30, 300 to acknowledge the connection of the controller 30, 300 to the console. The user can then optionally connect the headset 40 to the controller 30, 300 with the cable 35, causing the controller 30, 300 to automatically communicate information to the console 10 identifying the controller 30, 300 as an audio enabled controller (e.g., without requiring any action from the user for such audio transfer to occur, such as selecting using a menu that video game audio be transferred to the headset via the video game controller 30, 300), and in response the console 10 automatically ceases routing audio to the television 20 and instead automatically routes the audio from the video game to the controller 30, 300, which in turn routes the audio to the headset 40. Regardless of the volume level at the television 20 prior to connecting the headset 40 to the controller 30, 300, the volume level of audio sent to the headset 40 upon its connection with the controller 30, 300 is adjusted to a default audio level (e.g., 70% of maximum volume of the controller 30, 300, 60% of maximum volume of the controller, etc.). The user can then adjust volume to the headset 40 via the controller 30, 300 as described above in connection with FIGS. 5 and 8. The user can then play the video game while receiving the game audio via their headset 40.

The volume control range of the controller 30, 300 is separate from the volume control range at the console 10. For example, if the volume level at the console 10 is set to 50% of maximum, the volume level adjustments made with the controller 30, 300 will be relative to said 50% of maximum (e.g., if volume level at the controller 30, 300 is set to 70% of its maximum, the volume level will amount to being 70% of the 50% volume level provided by the console 10). That is, the volume level set at the console 10 is set as the maximum volume level by the controller 30, 300 and any adjustments to volume via the controller 30, 300 are made relative to said maximum volume level.

Optionally, upon connection of the headset 40 to the controller 30, 300, the console 10 can request the user to press one or more buttons on the controller 30, 300 to acknowledge the connection of the controller 30, 300 to the console 10.

Optionally, the user can decide to disconnect the headset 40 from the controller 30, 300, causing the controller 30, 300 to communicate information to the console 10 identifying the controller 30, 300 as a standard (non-audio enabled) controller, and in response the console 10 ceases routing audio to the controller 30, 300, and instead routes the audio from the video game to the television 20.

In another variation, the user optionally connects the video game controller 30, 300 (with the headset 40 connected to the controller 30, 300) to the video game console 10 (e.g., to the NINTENDO® Switch™ via a cable), causing the controller 30, 300 to automatically communicate information to the console 10 identifying the controller 30, 300 as an audio enabled controller. In response, the console 10 automatically routes the audio from the video game to the controller 30, 300, which in turn automatically routes the audio to the headset 40. The user can then play the video game while receiving the game audio via their headset 40. Optionally, upon connection of the controller 30, 300 (with the headset 40 connected to the controller 30, 300) to the console 10, the console 10 can request the user to press one or more buttons on the controller 30, 300 to acknowledge the connection of the controller 30, 300 to the console 10. Optionally, the user can decide to disconnect the headset 40 from the controller 30, 300, causing the controller 30, 300 to automatically communicate information to the console 10 identifying the controller 30, 300 as a standard (non-audio enabled) controller, and in response the console 10 automatically ceases routing audio to the controller 30, 300, and instead automatically routes the audio from the video game to the television 20. If at some point, the user reconnects their headset 40 to the controller 30, 300, the console 10 will again recognize the controller 30, 300 as an audio enabled controller, as discussed above (e.g., in FIG. 7), and automatically cease routing audio to the television 20 and instead automatically route the game audio to the headset 40 via the controller 30, 300.

Additional Embodiments

In some embodiments, a video game controller can include a controller body, a processor housed in the controller body, and a plurality of control inputs including a directional pad, a pair of thumbsticks and a plurality of buttons, each of the plurality of control inputs operable to control one or more operations of a video game. The processor can convert one or more operations of the plurality of control inputs into electrical signals and to communicate such signals to a video game console via a cable. The video game controller also includes an audio jack that receives an audio connector for a headset, the audio jack operable to communicate with the processor. The video game controller also includes a switch in communication with the audio jack and with the processor, the switch able to detect when the audio connector is coupled to the audio jack and to communicate a detection signal of said connection to the controller. The processor is operable to automatically communicate data to the video game console indicating the controller is audio enabled following receipt of the detection signal from the switch indicating the connection between the audio connector for the headset and the audio jack. The processor is further operable to automatically route audio from the video game console to the headset at a default volume level upon receiving the detection signal from the switch indicating the connection between the audio connector for the headset and the audio jack, the processor able to automatically adjust a volume level of the audio communicated from the console to the default volume level prior to communicating the audio to the headset.

Some embodiments include the video game controller of any one or more preceding embodiments, wherein the processor is operable to automatically communicate data to the video game console indicating the controller is non-audio enabled when the processor does not receive the detection signal from the switch indicating the connection between the audio connector for the headset and the audio jack.

Some embodiments include the video game controller of any one or more preceding embodiments, wherein the processor is operable to simulate the unplugging and plugging back of the video game controller with the console upon receiving the detection signal from the switch indicating the connection between the audio connector for the headset and the audio jack, prior to communicating said data to the video game console.

Some embodiments include the video game controller of any one or more preceding embodiments, wherein the processor is operable to simulate the unplugging and plugging back of the video game controller with the console by performing an ON/OFF reset function.

Some embodiments include the video game controller of any one or more preceding embodiments, wherein the default volume level is between 60% and 80% of a maximum audio volume level provided by the video game controller.

Some embodiments include the video game controller of any one or more preceding embodiments, wherein the processor is operable to adjust a volume level of the audio up or down relative to the default volume level via operation of one of the plurality of control inputs.

Some embodiments include the video game controller of any one or more preceding embodiments, further including an audio function control in communication with the processor, wherein actuation of the audio function control causes said one of the plurality of control inputs to change to an operating mode where movement of the control input in one direction or a second direction adjusts the volume level of the audio up or down.

Some embodiments include the video game controller of any one or more preceding embodiments, wherein said audio function control is an audio function button and wherein actuation of the audio function control includes pressing and holding down the audio function button while the control input is moved to adjust the volume level up or down for the audio communicated to the headset.

Some embodiments include the video game controller of any one or more preceding embodiments, wherein said one of the plurality of control inputs is the directional pad.

In some embodiments, a video game controller includes a controller body, a processor housed in the controller body, and a plurality of control inputs operable to control one or more operations of a video game. The processor is operable to convert one or more operations of the plurality of control inputs into electrical signals and to communicate such signals to a video game console via a cable. The controller body also includes an audio jack able to receive an audio connector for a headset, the audio jack able to communicate with the processor. The video game controller also includes a switch in communication with the audio jack and with the processor, the switch able to detect when the audio connector is coupled to the audio jack and to communicate a detection signal of said connection to the controller. The processor is operable to automatically communicate data to the video game console following receipt of the detection signal from the switch. The processor is further operable to automatically adjust a volume level of the audio communicated from the console to a default volume level and to automatically route the audio from the video game console to the headset at the default volume level upon receiving the detection signal from the switch.

Some embodiments include the video game controller of any one or more preceding embodiments, wherein the processor is operable to automatically communicate data to the video game console indicating the controller is non-audio enabled when the processor does not receive the detection signal from the switch.

Some embodiments include the video game controller of any one or more preceding embodiments, wherein the processor is operable to simulate the unplugging and plugging back of the video game controller with the console upon receiving the detection signal from the switch and prior to communicating said data to the video game console.

Some embodiments include the video game controller of any one or more preceding embodiments, wherein the processor is operable to simulate the unplugging and plugging back of the video game controller with the console by performing an ON/OFF reset function.

Some embodiments include the video game controller of any one or more preceding embodiments, wherein the processor is operable to adjust a volume level of the audio up or down relative to the default volume level via operation of one of the plurality of control inputs.

Some embodiments include the video game controller of any one or more preceding embodiments, further comprising an audio function button in communication with the processor, wherein pressing of the audio function button causes said one of the plurality of control inputs to change to an operating mode where movement of said control input in a first direction or a second direction adjusts the volume level of the audio up or down.

Some embodiments include the video game controller of any one or more preceding embodiments, wherein pressing of the audio function button includes continuously pressing the audio function button while said control input is moved to adjust the volume level up or down for the audio communicated to the headset.

Some embodiments include the video game controller of any one or more preceding embodiments, wherein said one of the plurality of control inputs is a directional pad.

In some embodiments, a method for operating a video game controller includes connecting a video game controller to a video game console via a cable. The video game controller includes a controller body, a processor housed in the controller body, a plurality of control inputs operable to control one or more operations of a video game. The processor is operable to convert one or more operations of the plurality of control inputs into electrical signals and to communicate such signals to the video game console. The video game controller also includes an audio jack able to receive an audio connector for a headset, the audio jack able to communicate with the processor. The video game controller also includes a switch in communication with the audio jack and with the processor, the switch able to detect when the audio connector is coupled to the audio jack and to communicate a detection signal of said connection to the controller. The processor is operable to automatically communicate data to the video game console following receipt of the detection signal from the switch, the processor further operable to automatically adjust a volume level of the audio communicated from the console to a default volume level and to automatically route the audio from the video game console to the headset at the default volume level upon receiving the detection signal from the switch. The method also includes connecting the audio connector of the headset to the audio jack of the video game controller to cause the processor to automatically communicate data to the video game console following receipt of the detection signal from the switch, the processor further automatically adjusting a volume level of the audio communicated from the video game console to a default volume level and automatically routing the audio from the video game console to the headset at the default volume level.

Some embodiments include the method of operating the video game controller of any one or more preceding embodiments, further comprising automatically communicating data from the processor to the video game console indicating the controller is non-audio enabled when the processor does not receive the detection signal from the switch.

Some embodiments include the method of operating the video game controller of any one or more preceding embodiments, wherein the headset to the controller includes simulating via the processor the unplugging and plugging back of the video game controller with the console upon receiving the detection signal from the switch.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the invention need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed controllers.

What is claimed is:

1. A video game controller, comprising:
a controller body;
a processor housed in the controller body;
a plurality of control inputs comprising a directional pad, a pair of thumbsticks and a plurality of buttons, each of the plurality of control inputs operable to control one or more operations of a video game, the processor configured to convert one or more operations of the plurality of control inputs into electrical signals and to communicate such signals to a video game console via a cable;
an audio jack configured to receive an audio connector for a headset, the audio jack configured to communicate with the processor; and
a switch in communication with the audio jack and with the processor, the switch configured to detect when the audio connector is coupled to the audio jack and to communicate a detection signal of said connection to the controller,
wherein the processor operable to automatically communicate data to the video game console indicating the controller is audio enabled following receipt of the detection signal from the switch indicating the connection between the audio connector for the headset and the audio jack, the processor further configured to automatically route audio from the video game console to the headset at a default volume level upon receiving the detection signal from the switch indicating the connection between the audio connector for the headset and the audio jack, the processor configured to automatically adjust a volume level of the audio communicated from the console to the default volume level prior to communicating the audio to the headset.

2. The video game controller of claim 1, wherein the processor is operable to automatically communicate data to the video game console indicating the controller is non-audio enabled when the processor does not receive the detection signal from the switch indicating the connection between the audio connector for the headset and the audio jack.

3. The video game controller of claim 1, wherein the processor is operable to simulate the unplugging and plugging back of the video game controller with the console upon receiving the detection signal from the switch indicating the connection between the audio connector for the headset and the audio jack, prior to communicating said data to the video game console.

4. The video game controller of claim 3, wherein the processor is operable to simulate the unplugging and plugging back of the video game controller with the console by performing an ON/OFF reset function.

5. The video game controller of claim 1, wherein the default volume level is between 60% and 80% of a maximum audio volume level provided by the video game controller.

6. The video game controller of claim 1, wherein the processor is operable to adjust a volume level of the audio up or down relative to the default volume level via operation of one of the plurality of control inputs.

7. The video game controller of claim 6, further comprising an audio function control in communication with the processor, wherein actuation of the audio function control causes said one of the plurality of control inputs to change to an operating mode where movement of the control input in one direction or a second direction adjusts the volume level of the audio up or down.

8. The video game controller of claim 7, wherein said audio function control is an audio function button and wherein actuation of the audio function control includes pressing and holding down the audio function button while the control input is moved to adjust the volume level up or down for the audio communicated to the headset.

9. The video game controller of claim 8, where said one of the plurality of control inputs is the directional pad.

10. A video game controller, comprising:
a controller body;
a processor housed in the controller body;
a plurality of control inputs operable to control one or more operations of a video game, the processor configured to convert one or more operations of the plurality of control inputs into electrical signals and to communicate such signals to a video game console via a cable;
an audio jack configured to receive an audio connector for a headset, the audio jack configured to communicate with the processor; and
a switch in communication with the audio jack and with the processor, the switch configured to detect when the audio connector is coupled to the audio jack and to communicate a detection signal of said connection to the controller,
wherein the processor operable to automatically communicate data to the video game console following receipt of the detection signal from the switch, the processor further configured to automatically adjust a volume level of the audio communicated from the console to a default volume level and to automatically route the audio from the video game console to the headset at the default volume level upon receiving the detection signal from the switch.

11. The video game controller of claim 10, wherein the processor is operable to automatically communicate data to the video game console indicating the controller is non-audio enabled when the processor does not receive the detection signal from the switch.

12. The video game controller of claim 10, wherein the processor is operable to simulate the unplugging and plugging back of the video game controller with the console upon receiving the detection signal from the switch and prior to communicating said data to the video game console.

13. The video game controller of claim 12, wherein the processor is operable to simulate the unplugging and plugging back of the video game controller with the console by performing an ON/OFF reset function.

14. The video game controller of claim 10, wherein the processor is operable to adjust a volume level of the audio up or down relative to the default volume level via operation of one of the plurality of control inputs.

15. The video game controller of claim 14, further comprising an audio function button in communication with the processor, wherein pressing of the audio function button causes said one of the plurality of control inputs to change to an operating mode where movement of said control input in a first direction or a second direction adjusts the volume level of the audio up or down.

16. The video game controller of claim 15, wherein pressing of the audio function button includes continuously pressing the audio function button while said control input is moved to adjust the volume level up or down for the audio communicated to the headset.

17. The video game controller of claim 16, where said one of the plurality of control inputs is a directional pad.

18. A method for operating a video game controller, comprising:
　　connecting a video game controller to a video game console via a cable, the video game controller comprising
　　　a controller body;
　　　a processor housed in the controller body;
　　　a plurality of control inputs operable to control one or more operations of a video game, the processor configured to convert one or more operations of the plurality of control inputs into electrical signals and to communicate such signals to the video game console;
　　　an audio jack configured to receive an audio connector for a headset, the audio jack configured to communicate with the processor; and
　　　a switch in communication with the audio jack and with the processor, the switch configured to detect when the audio connector is coupled to the audio jack and to communicate a detection signal of said connection to the controller,
　　　wherein the processor operable to automatically communicate data to the video game console following receipt of the detection signal from the switch, the processor further configured to automatically adjust a volume level of the audio communicated from the console to a default volume level and to automatically route the audio from the video game console to the headset at the default volume level upon receiving the detection signal from the switch;
　　connecting the audio connector of the headset to the audio jack of the video game controller to cause the processor to automatically communicate data to the video game console following receipt of the detection signal from the switch, the processor further automatically adjusting a volume level of the audio communicated from the video game console to a default volume level and automatically routing the audio from the video game console to the headset at the default volume level.

19. The method of claim 18, further comprising automatically communicating data from the processor to the video game console indicating the controller is non-audio enabled when the processor does not receive the detection signal from the switch.

20. The method of claim 18, wherein the headset to the controller includes simulating via the processor the unplugging and plugging back of the video game controller with the console upon receiving the detection signal from the switch.

\* \* \* \* \*